(12) United States Patent
Busch et al.

(10) Patent No.: US 6,240,722 B1
(45) Date of Patent: Jun. 5, 2001

(54) METHOD FOR DETERMINING THE FULLNESS OR QUALITY OF A CATALYTIC CONVERTER THAT STORES GASES

(75) Inventors: Michael-Rainer Busch, Ebersbach; Aleksandar Knezevic, Munich; Ralf Moos, Friedrichshafen; Carsten Plog, Markdorf, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/248,997

(22) Filed: Feb. 12, 1999

(30) Foreign Application Priority Data

Feb. 13, 1998 (DE) .............................. 198 05 928

(51) Int. Cl.$^7$ ....................................... F01N 3/00
(52) U.S. Cl. .................. 60/277; 60/274; 60/303
(58) Field of Search ........................ 60/274, 276, 277, 60/285, 286, 290, 303

(56) References Cited

U.S. PATENT DOCUMENTS

| | | | |
|---|---|---|---|
| 3,805,522 | * | 4/1974 | Sheppard ............................... 60/290 |
| 3,962,866 | * | 6/1976 | Neidhard et al. ...................... 60/276 |
| 4,007,589 | * | 2/1977 | Neidhard et al. ...................... 60/276 |
| 4,012,906 | * | 3/1977 | Hattori et al. ......................... 60/277 |
| 4,128,998 | * | 12/1978 | Hattori et al. ......................... 60/277 |
| 5,261,230 | * | 11/1993 | Yuuki et al. ........................... 60/276 |
| 5,428,955 | * | 7/1995 | Yuuki et al. ........................... 60/276 |
| 5,538,698 | * | 7/1996 | Abe et al. .............................. 60/277 |
| 5,724,952 | * | 3/1998 | Miyashita et al. ..................... 60/277 |

FOREIGN PATENT DOCUMENTS

| | | |
|---|---|---|
| 41 12 478 A1 | 10/1992 | (DE) . |
| 61-262650 | 11/1986 | (JP) . |
| 61-274748 | 12/1986 | (JP) . |
| 63-165744 | 7/1988 | (JP) . |
| 7-275659 | 10/1995 | (JP) . |
| 8-10626 | 1/1996 | (JP) . |
| 8-15139 | 1/1996 | (JP) . |
| 10-2889 | 1/1998 | (JP) . |

OTHER PUBLICATIONS

H.M. Widenmann et al., "Zro–Lambda–Sonden für die Gemischregelung im Kraftfahrzeug." In: *Schaumburg Hanno (Hrsq.) : Sensoranwendungen*, Teubner–Verlag, Stuttgart, Germany (1995), pp. 371–399.

O. Glöckler et al., "Eigendiagnose moderner Motorsteuerungssysteme—Enteicklungsstand und erste Erfahrungen mit OBD II fü r USA."

N. Rao et al., "Potentiometric NOx (x=1,2) sensors with $Ag^+$–$\beta$"–alumina as solid electrolyte and Ag metal as solid reference, *Solid State Ionics*, 52 (1992), pp. 339–346.

"Thick Film ZrO2 NOx Sensor," SAE Technical Paper No. 960334, International Congress & Exposition, Detroit, Michigan, Feb. 26–29, 1996.

S. Somov et al., "Gas analysis with arrays of solid state electrochemical sensors: implications to monitor HCs and NOx in exhausts," *Sensors and Actustors*, B 35–36 (1996) 409–418.

(List continued on next page.)

Primary Examiner—Teresa Walberg
Assistant Examiner—Fadi H. Dahbour
(74) Attorney, Agent, or Firm—Evenson, McKeown, Edwards & Lenahan, P.L.L.C.

(57) ABSTRACT

A method for determining the fullness or the quality of a catalytic converter that stores gases in a storage medium includes the steps of measuring a change in at least one physical property of the storage medium that changes with the storage process, and determining the fullness or the quality of the catalytic converter.

25 Claims, 6 Drawing Sheets

OTHER PUBLICATIONS

E. Otto et al., "Die Systementwicklung des elektrisch heizbaren Katalysators (E–Kat) für die LEV/ULEV und EU3 Gesetzgebung," *MTZ*, 56(9) (1995).

F. Albrecht et al., "BMW Sechszylinder Technil für TLE-V–und OBD II–Anforderungen in den USA," *MTZ* 57(10) (1996).

I.E. Maxwell et al., "Recent developments in materials science as applied to catalysis," *Solid State & Materials Science*, 1 (1996), pp. 57–64.

C. Plog et al., "Combustion gas sensitivity of zeolite layers on thin–film capacitors," *Sensors and Actuators*, B 24–25 (1995), pp. 403–406.

* cited by examiner

METHOD FOR DETERMINING THE FULLNESS OR QUALITY OF A CATALYTIC CONVERTER THAT STORES GASES

BACKGROUND AND SUMMARY OF THE INVENTION

This application claims the priority of German Patent Application No. 198 05 928.0, filed Feb. 13, 1998, the disclosure of which is expressly incorporated by reference herein.

The present invention relates to a method for determining the fullness (i.e., remaining capacity) or quality of a catalytic converter that stores gases using a storage medium.

Increasingly, strict air pollution laws combined with the pressure to reduce fuel consumption require new concepts for both internal combustion engines and exhaust scrubbing. This also means new concepts for monitoring exhaust scrubbing systems.

The problems described below occur particularly in conjunction with catalytic converters that store gases.

In a stoichiometrically operated four-cycle engine (so-called "$\lambda=1$ engine") the air/fuel ratio $\lambda$ of the raw exhaust is detected using a first $\lambda$ probe. Depending on the deviation from the ideal state ($\lambda=1$), the air/fuel ratio is then adjusted slightly. In practice, this produces a $\lambda$-oscillation of the raw exhaust around the stoichiometric point ($\lambda=1$). However, $\lambda=1$ must be maintained in a time average. See Wiedenmann et al., "$ZrO_2$ Lambda Probes for Regulating Mixtures in Motor Vehicles," in Schaumburg, Hanno, *Sensor Applications*, Teubner Verlag, Stuttgart (1995), 371–399.

The oscillation frequency lies in the range of several tenths of a second to several seconds. Because of the ability of a so-called "three-way catalytic converter" located downstream from the first $\lambda$ probe to store oxygen, optimum conversion always takes place provided the catalytic converter is still in good condition. As the quality of the catalytic converter deteriorates (i.e., the conversion rate decreases and the response temperature increases), the ability of the catalytic converter to store oxygen likewise decreases. A second $\lambda$ probe located downstream from the catalytic converter will then be able to detect the oscillation of the air/fuel ratio. The quality of the catalytic converter can be determined by evaluating the ratio between the amplitudes of the first and second $\lambda$ probes. Glökler & Mezger, *Self-Diagnosis of Modern Engine Control Systems*, "State of Development and Initial Experiences with OBD2 for the USA," 38–52. In this method, only an indirect method is involved, which encounters limits in novel high-efficiency catalytic converters like those used for ULEV requirements, for example.

Many oxides of nitrogen are produced in an internal combustion engine operated with an air surplus (the so-called "lean engine" or Diesel engine, for example). One possible exhaust scrubbing concept provides for installing in the exhaust line of a motor vehicle a catalytic converter that can store nitrogen oxides for a certain period of time. Following this "storage phase" in which the catalytic converter is "filled" with the exhaust component to be stored, a desorption phase follows in which the catalytic converter is "drained". See Strehlau et al., "New developments in lean NOx catalysis for gasoline-fueled passenger cars in Europe," SAE Paper 962047 (1996).

In current concepts for determining the fullness of the catalytic converter and the regulation of the fuel/air ratio associated therewith, gas sensors are used which measure the gas to be stored (NOx), downstream from the catalytic converter. A breakthrough by the gas downstream from the catalytic converter indicates that the catalytic converter is filled with the gas to be stored and that "drainage" (the so-called desorption phase) must be initiated. Patents and publications about NOx sensors exist in great numbers. Such patents include, for example, European patent document EP 0 257 842; U.S. Pat. No. 5,466,350; and German patent document DE 4308767. Such publications include, for example, (1) Rao et al., "Potentiometric NOx (x=1,2) Sensors with Ag-β" as Solid Electrolytes and Ag Metal as Solid Reference," *Solid State Ionics* 52 (1992) 339–346; (2) Kato et al., "Thick Film $ZrO_2$ NOx sensor," SAE Paper 960334 (1996); and (3) Somov et al., "Gas Analysis with Arrays of Solid-State Electrochemical Sensors: Implications to Monitor HCs and NOx in Exhausts," *Sensors and Actuators*, B. 35–36 (1996) 409–418. However, such sensors do not actually- detect the fullness of the catalytic converter, but rather the NOx content of the exhaust. In addition, many sensors have stability problems and are cross-sensitive to oxygen and/or water and carbon monoxide in addition to NOx. Another disadvantage of this method is that a signal to the engine control to "clear out" (i.e., drain or desorb) can only be given after the breakthrough of the gas from the catalytic converter has already occurred.

The catalytic converter temperature is insufficient to catalytically burn the hydrocarbons that are produced during a cold start. In addition to proposed solutions that provide electrical preheating (Otto et al., "System development of the electrically heatable catalytic converter for the LEV/ULEV and EU3 legislation, " MTZ 56 (9) (1995) 488 et seq.) or which provide for a firewall catalytic converter to be located very close to the engine in combination with secondary air being blown in (Albrecht et al., "BMW 6-Cylinder Technology for TLEV and OBD2 Requirements in the USA," MTZ 57 (10) (1996)), systems that store hydrocarbons have also been discussed which give up their stored hydrocarbons when the starting temperature is reached. Hydrocarbon sensors are required to monitor such systems but they also have problems with stability and cross-sensitivity.

The object of the present invention is to provide a method for determining the fullness or the quality of catalytic converters that store gases, which overcomes the disadvantages of the prior art. Such catalytic converters can be used for scrubbing exhaust gases of motor vehicles.

According to the present invention, this object is achieved by direct methods for detecting the quality of a catalytic converter or for detecting the fullness of a catalytic converter. These methods detect the conversion of a catalytic converter coating (also referred to as a storage medium because of its storage ability) on the basis of a chemical interaction between the gas to be stored (e.g., oxygen, carbon monoxide, nitrogen oxides, or hydrocarbons) and the coating. Thus, the quality of the catalytic converter and/or the fullness of the catalytic converter is detected.

In the chemical interactions that take place during storage or draining, the chemical state of the catalytic converter coating of the monolith changes. The coating is typically composed of wash coat, noble metals, and storage elements. In a three-way catalytic converter, as the conversion rate declines and the quality of the catalytic converter decreases, the nature and the structure of the active catalytic surface changes as well. As the coating changes, the physical properties also change, for example, the complex dielectric constant, the electrical conductivity, index of refraction, and the like.

The fullness of the catalytic converter and the diagnosis of the catalytic converter quality can be performed by determining those physical properties of the catalytic converter coating that change with the storage process. In particular, the fullness or the quality of the catalytic converter can be determined by measuring the complex electrical impedance Z, which also includes the electrical DC resistance. The complex electrical impedance Z is defined as the sum of the real part Re[Z] and the imaginary part Im[Z] of the complex impedance Z. The electrical impedance Z changes with the applied measuring frequency. A suitable frequency range is greater than or equal to 0 Hz (DC). An upper limiting frequency may be at a wavelength corresponding to a measurement frequency that is much smaller than the dimensions of the measuring arrangement. Preferably, a suitable measuring frequency is chosen and the complex impedance is determined at this frequency from the real part and the imaginary part, or a measurement signal derived from one or both of these two values is recorded. Typical measurements include the following: the value of the complex impedance |Z|, the DC resistance, the capacitance, the loss factor, or the detuning of the oscillating circuit. Additional electrical measured values that can be used are the Seebeck coefficient (also called the thermal electromotive force) or the temperature curve of the abovementioned electrical values.

Additional non-electric measured values that can be used to determine the fullness or quality of the catalytic converter are the optical index of refraction, the optical absorption or reflection coefficient, or the change in mass or volume.

Instead of measuring the physical properties of the storage medium itself, a medium that is identical or similar to the storage medium of the catalytic converter as far as its physical properties are concerned can be located separately from the catalytic converter in the exhaust stream and the changes in the physical properties of this identical or similar medium can be measured.

Other objects, advantages and novel features of the present invention will become apparent from the following detailed description of the invention when considered in conjunction with the accompanying drawings.

DETAILED DESCRIPTION OF THE DRAWINGS

Figure 1:
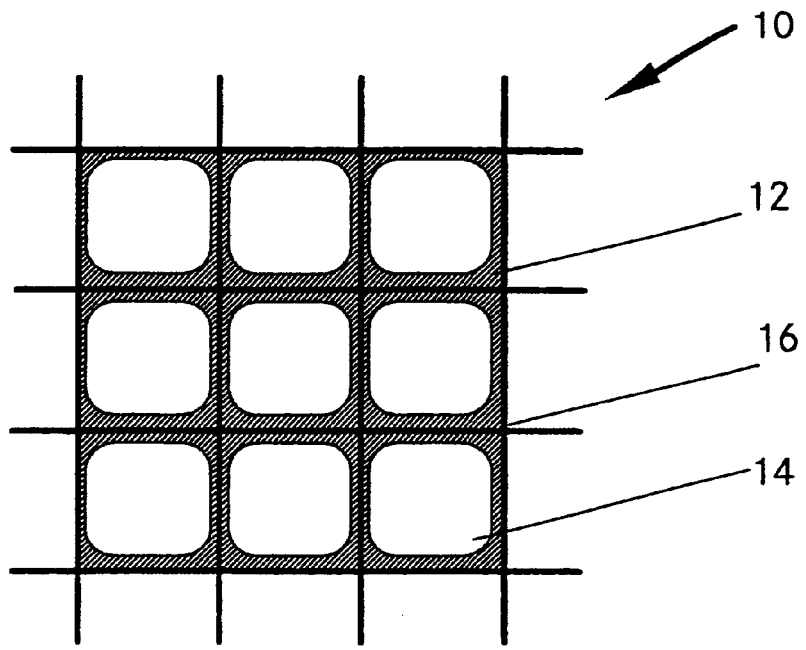
FIGS. 1 to 7 Show arrangements for measuring the complex impedance of the storage medium.

FIG. 1 shows schematically a section through a catalytic converter 10 in which a special coating is applied to walls 16 of a support structure provided with channels 14. The coating determines the function of the catalytic converter. The coating is also referred to as a storage medium in the following. For example, in the case of an NOx storage catalytic converter, the coating consists, among other things, of a catalytically active noble metal and $BaCO_3$. See S. Matsumoto, "DeNOx Catalyst for Automotive Lean Burn Engine," *Catalytic Science and Technology*, 1 (1995) 39–42; and Maxwell & Lednor, "Recent Developments in Materials Science as Applied to Catalysis, *Current Opinion in Solid-State and Materials Science*, 1 (1996), 57–64. Nitrogen oxides produced in the engine (NOx, with NO as the main component) are stored and oxidized with the aid of the catalytically active noble metal, thereby producing $N_2$. $NO_2$ and $BaCO_3$ react to form $BaNO_3$ and $CO_2$. Storage can continue only until all the $BaCO_3$ available to the NO has been changed to $BaNO_3$. Then the catalytic converter must be cleaned out again (i.e., drained). This can be accomplished by reduction, with CO as an exhaust component converting $BaNO_3$ back to $BaCO_3$.

Figure 2:
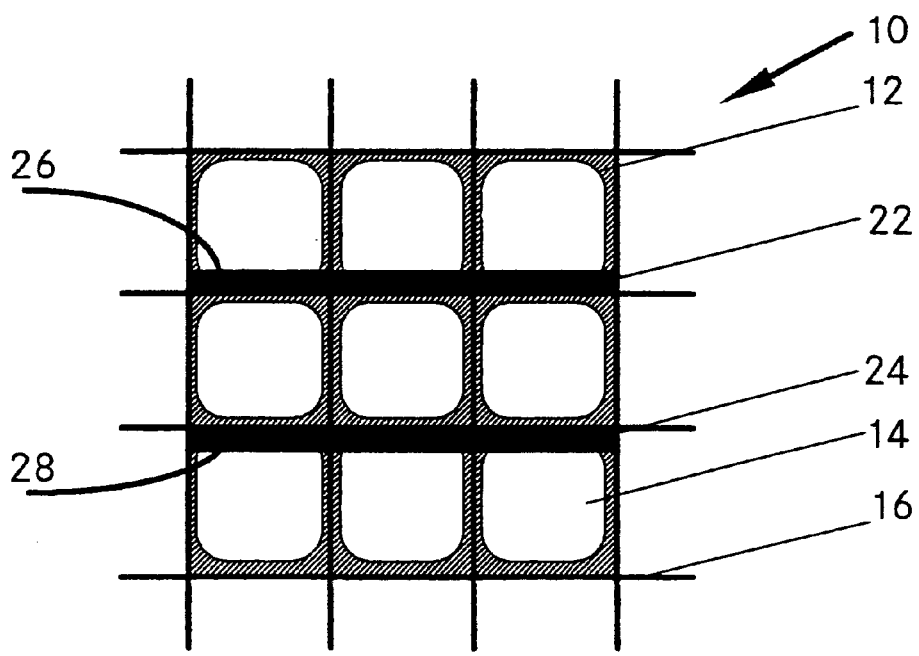

A typical measuring arrangement that can measure the complex impedance of storage medium 12 is shown in FIG. 2. Two electrodes 22 and 24 provided with leads 26 and 28 are inserted into the catalytic converter so that a capacitative system results whose electrical impedance can be measured. Depending on the desired value of the impedance, the electrodes can extend over one or more cells of the catalytic converter. The dimensions of the electrodes 22, 24 that enter the plane of the drawing likewise determine the electrical impedance Z. It is important to note that in this arrangement, as well as in all the others that are possible according to the present invention, the coating material 12 located between the electrodes can be readily reached by the exhaust.

Figure 3:
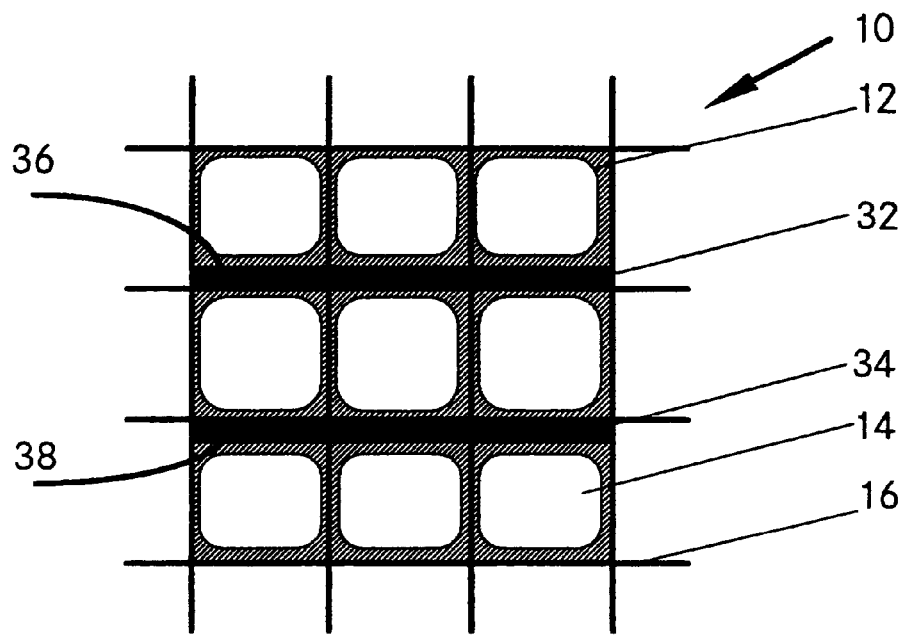

Another arrangement according to the present invention is shown in FIG. 3. In this case, the electrodes 32 and 34 are mounted directly on the inside walls 16. The storage medium 12 is located on the electrodes as well as on the other inside walls.

Figure 4:
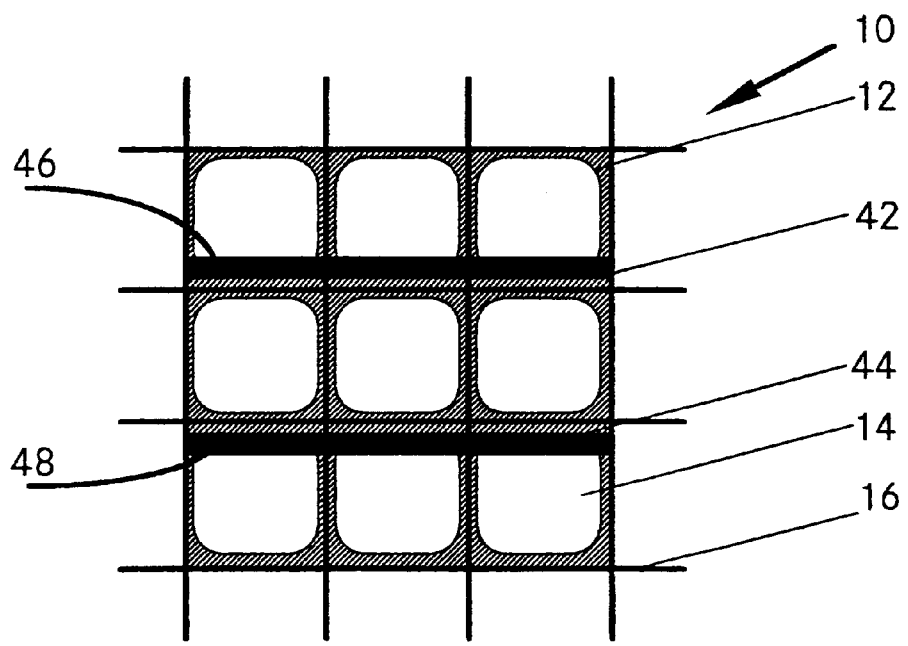

FIG. 4 shows another possible embodiment. The storage medium 12 on which electrodes 42 and 44 have likewise been mounted is on the inside walls 16 of the monolith. In this embodiment, the electrodes have a porosity such that they are permeable to gas. On the other hand, however, an electrical passageway must be provided, which limits the porosity.

Figure 5:
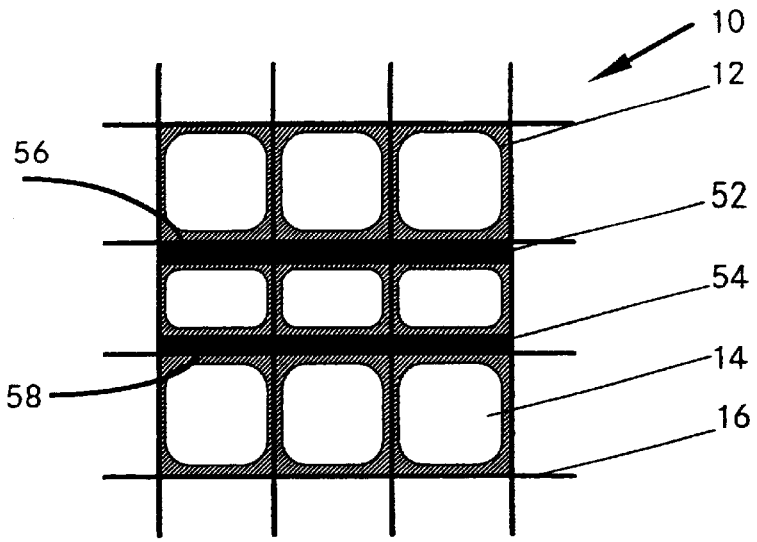

Another possible embodiment is shown in FIG. 5. In this case the storage medium is applied to electrodes 52 and 54. In contrast to the previous illustrations, the complex impedance of inside walls 16 is therefore not measured at the same time.

Figure 6:
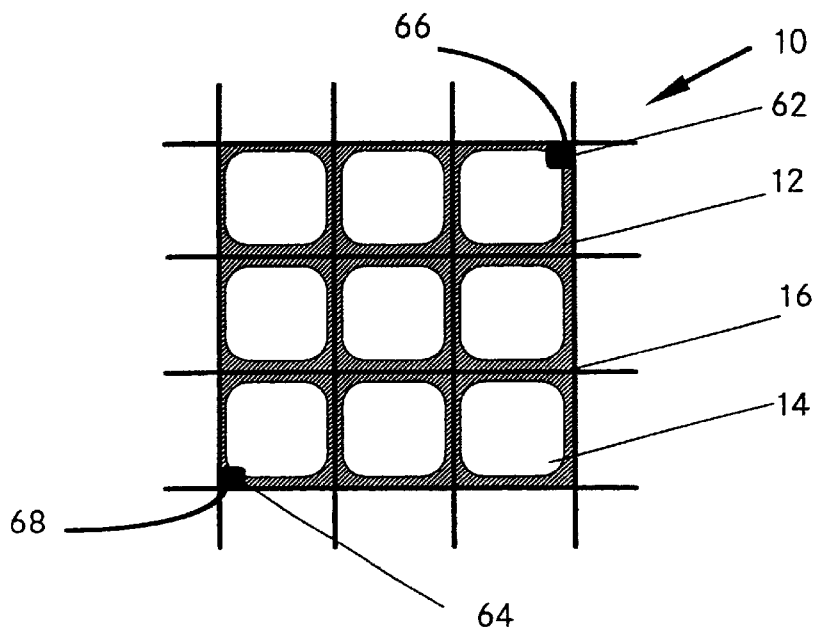

Another possible embodiment is shown in FIG. 6. The electrodes 62 and 64 are arranged in the plane of the drawing parallel to channels 14. The electrical impedance is measured at leads 66 and 68. The local arrangement of the electrodes 62 and 64 can be adjusted to suit the application.

Figure 7:
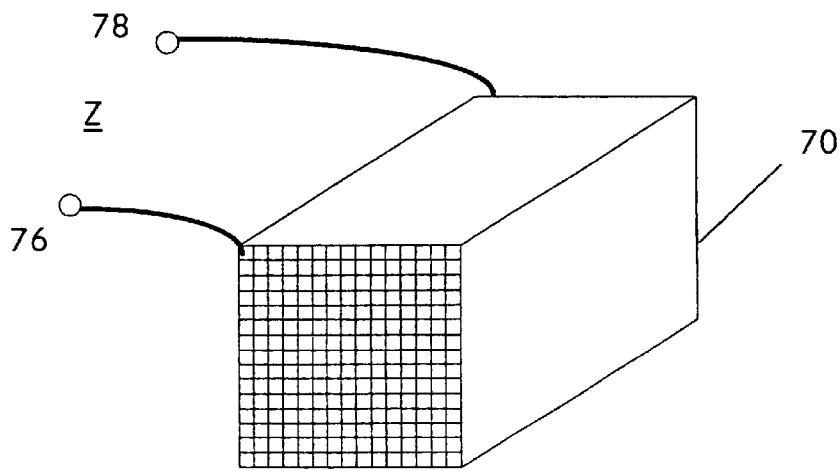

In FIG. 7 the impedance between electrodes 76 and 78 is measured over the entire monolith 70. The local arrangement of the electrodes can likewise be adjusted to suit the application.

Figure 8:
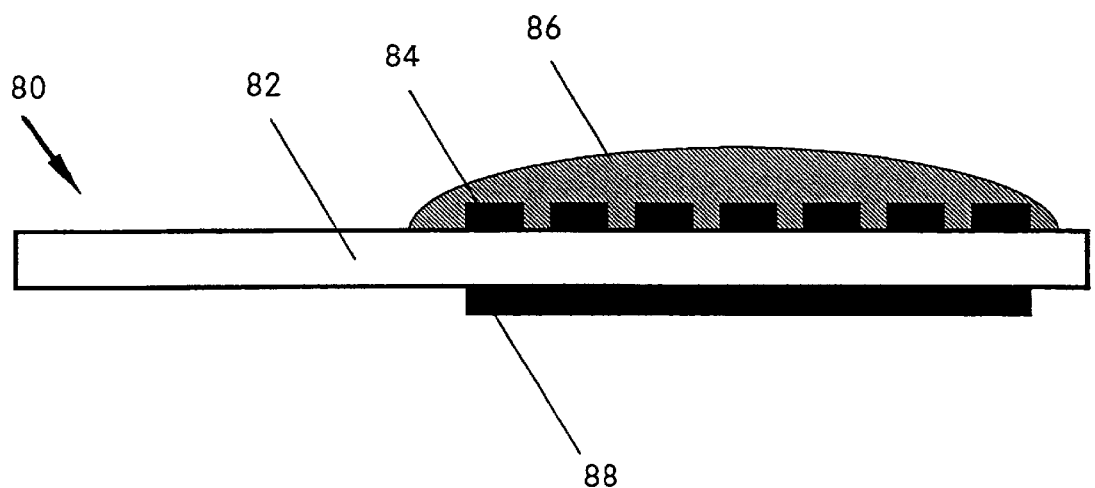
FIGS. 8 and 9 show arrangements for measuring the complex impedance of a medium that is identical or similar to the storage medium of the catalytic converter.

FIG. 8 shows a section through a sample arrangement for measuring the complex impedance of a medium that is identical or similar to the storage medium of the catalytic converter as far as its physical properties are concerned. The medium is provided in addition to the catalytic converter in the exhaust line. The basic design resembles the arrangements in European patent document EP 0 426 989; U.S. Pat. No. 5,143,696; or in Plog et al., "Combustion Gas Sensitivity of Zeolite Layers on Thin-Film Capacitors, *Sensors and Actuators* B 24–25 (1995), 403–406. A layer 86 is applied to a transducer 80, consisting of a heater 88 on the underside of a substrate 82, preferably made of ceramic, quartz, or silicon and with a suitable conductor or electrode structure 84 (preferably in an interdigitated structure) on top of the substrate. Leads attached to transducer 80 make it possible to measure the electrical impedance. The arrangement is installed in a suitable housing and positioned in the exhaust line so that the layer is exposed to the exhaust. In contrast to the references listed above, layer 86 consists of a material that is the same or similar in terms of its physical/chemical properties, such as the coating (Ref. 12 in FIGS. 1 to 6) of a catalytic converter that is also located in the exhaust line. Therefore, the fullness or the quality of the catalytic converter can be detected with the aid of such an arrangement.

The electrical heater 88 comprises, for example, metal strips 100 nm to 20 $\mu$m thick. Storage medium 86 has a layer thickness between 100 nm and 1000 $\mu$m, for example. The metal electrode structure 84 has a layer thickness of 100 nm and 20 $\mu$m, for example.

Figure 9:
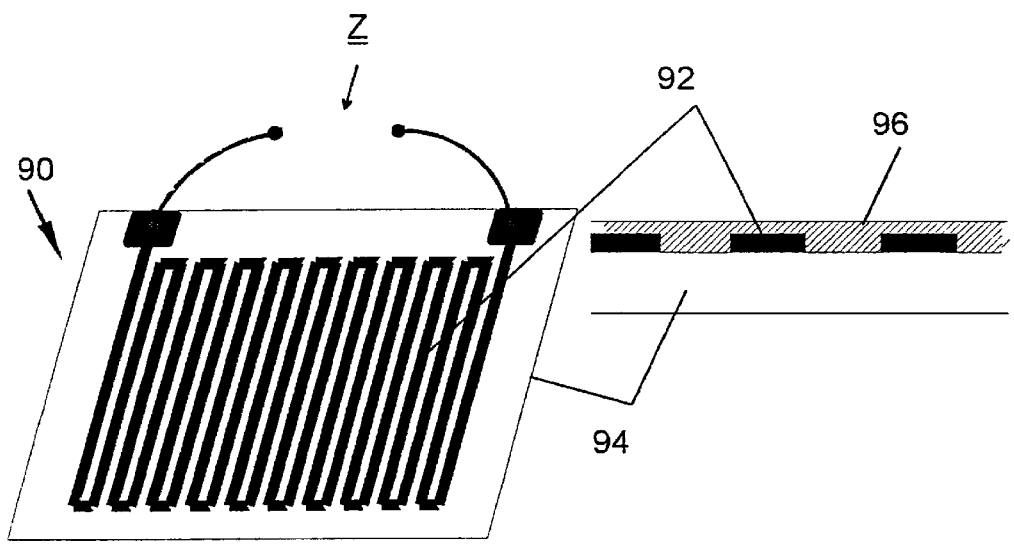

FIG. 9 shows an arrangement 90 with an electrical conductor which in this case is made in the form of a conducting layer 92 applied to a carrier substrate 94 preferably made of ceramic, quartz, or silicon. Electrical conductor 92 is coated with the same or a similar material 96 as the catalytic converter monolith. The electrical impedance Z of this electrical conductor charged with alternating current depends on the substance surrounding it. In this embodiment layer 96, which acts as a dielectric, changes because of the electrical interaction with the exhaust components and results in a change in the loss resistance as well as in the complex electrical impedance Z.

Another embodiment not shown here is the formation of a resonance circuit (1) by means of a hollow conductor in the catalytic converter, or (2) separately constructed from the catalytic converter in which the same or similar coating materials are added that are also used in the catalytic converter.

Another embodiment that is likewise not shown here can be the construction of an optical measuring system that measures the reflectivity or absorptivity or the optical index of refraction of the storage medium. The material storing the gases can then be located directly in the catalytic converter or in an additional structural elements.

Figure 10:
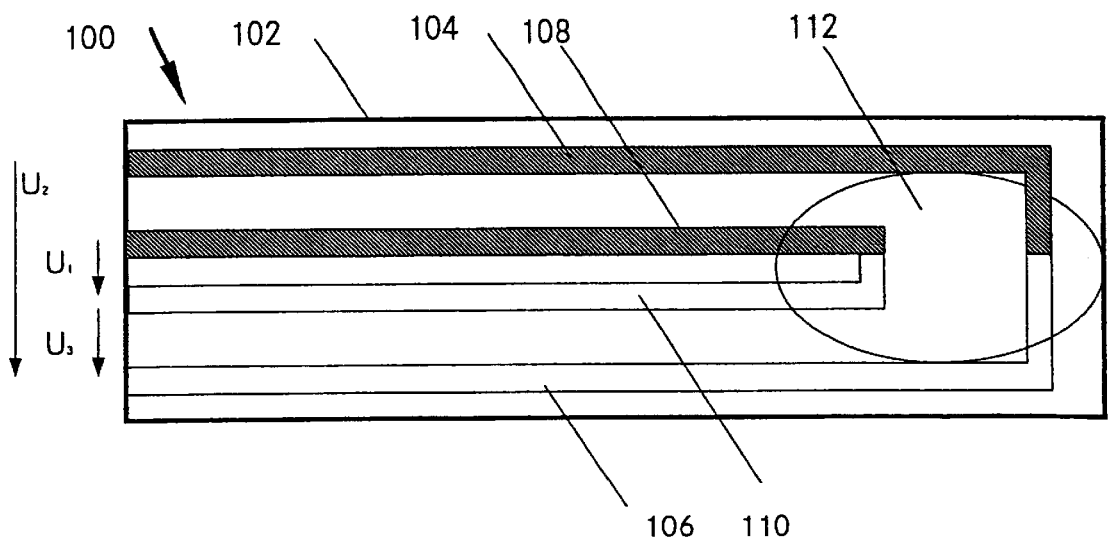
FIG. 10 shows an arrangement for measuring the thermal electromotive force of the medium that is identical or similar to the storage medium in the catalytic converter.

The structure of a sample arrangement for detecting catalytic converter fullness or catalyst quality by measuring the thermo electromotive force is shown in FIG. 10. A layer 112 is mounted on a transducer 100 that comprises (1) a heater (not shown) on the underside of a substrate 102 preferably made of ceramic, quartz, or silicon; and (2) thermocouples 104, 106, 108, 110 on the top of the substrate. The electrical heater consists, for example, of metal strips 100 nm to 20 $\mu$m thick. The metal conductors 104 and 106 as well as 108 and 110 are connected together electrically at the contacts and each forms a thermocouple pair. Typical suitable material combinations for the thermocouple pairs are NiCr/Ni or Pt/PtRh. The leads attached to transducer 100 make it possible to measure the voltages $U_1$, (voltage between 108 and 110) and $U_2$ (voltage between 104 and 106). The arrangement is housed in a suitable housing and thus positioned in the exhaust line downstream from a catalytic converter so that the layer 112 is exposed to the exhaust. Layer 112 consists of the same or a similar material as the coating (Ref. 12 in FIGS. 1 to 6) of the catalytic converter located upstream. The heater structure is designed so that different temperatures prevail at the contacts between the two thermocouple pairs. Provided the temperatures at the contacts do not differ too much, the difference between the voltages $U_1$, and $U_2$ is proportional to the temperature differential $\Delta t$ at the contacts. The proportionality factor results from the selected material combination. The voltage $U_3$ (voltage between 106 and 110) is a linear function of the temperature differential $\Delta t$ and the thermo electromotive force of the layer 112. Therefore, the catalytic converter fullness or catalyst quality can be detected with such an arrangement.

Figure 11:
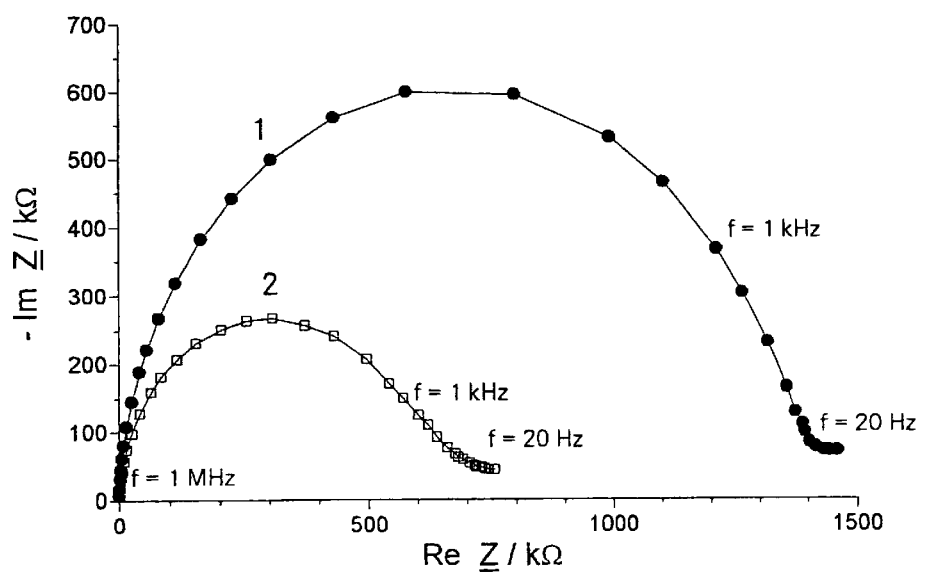
FIG. 11 shows a graph recorded with a system according to FIG. 4.

FIG. 11 shows a typical measurement result obtained with one of the measuring arrangements described above for measuring impedance. Curve 1 (symbol "●") provides the impedance spectrum of a drained catalytic converter while Curve 2 (symbol □) represents the impedance spectrum of a catalytic converter loaded with NO. Each symbol provides a measured value that consists of the real part and the imaginary part of the complex impedance recorded at a certain measuring frequency. The frequency range in this case was 20 Hz to 1 MHz. With a constant measuring frequency, both the real part and the imaginary part of the impedance change clearly.

Figure 12:
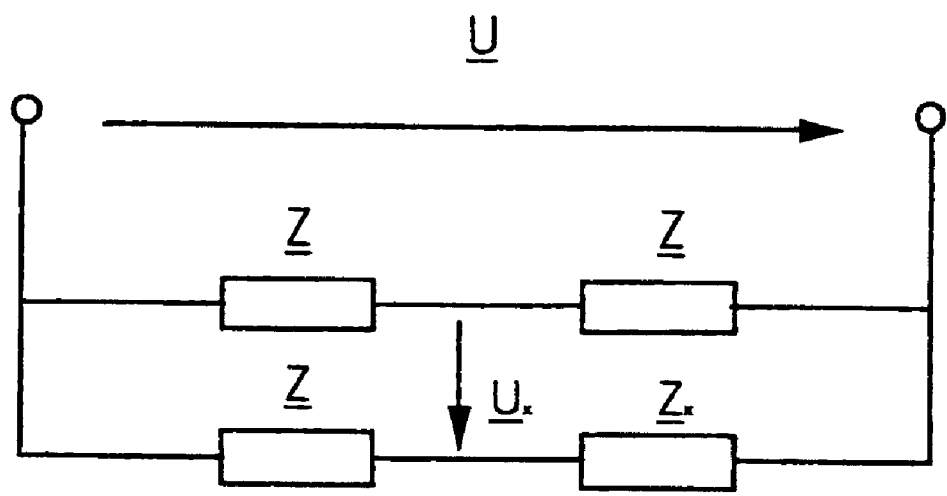
FIG. 12 shows an evaluation circuit for controlling a regulating circuit as a function of the impedance of the storage medium or of the identical or similar medium.

FIG. 12 shows a simple evaluation circuit that can deliver a suitable voltage signal to control a regulating circuit or an evaluation unit (an engine control device, for example). In a bridge circuit powered by alternating voltage U and consisting of three complex resistances Z and the complex impedance $Z_x$ to be determined, the diagonal voltage $U_x$ will change together with the complex impedance $Z_x$, the signal of the diagonal voltage $U_x$ can be supplied directly to the regulating device.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for determining a fullness or quality of a catalytic converter situated in an exhaust gas stream and having a storage medium for storing gases, said method comprising:

measuring a chance in at least one physical property of the storage medium that changes with an amount of gas stored therein; and determining a fullness or quality of the catalytic converter based on a result of said measurement;

wherein the at least one physical property is complex electrical impedance.

2. A method according to claim 1, wherein said measuring of the complex impedance is at one or more frequencies greater than 0 Hz.

3. A method according to claim 1, wherein an upper limiting frequency is a wavelength that is less than dimensions of a measuring arrangement.

4. A method according to claim 1, comprising:

providing an electrical device having at least two electrodes and a storage medium between the at least two electrodes; and using said electrical device for measurement of the complex electrical impedance.

5. A method according to claim 4, wherein the at least two electrodes are located on an inside wall of a support structure.

6. A method according to claim 4, wherein:

at least two electrodes are located on an inside wall of a support structure; and at least one layer of the storage medium is applied to the at least two electrodes.

7. A method according to claim 4, wherein:

at least one layer of the storage medium is applied to an inside wall of a support structure; and the at least two electrodes are located on the storage medium.

8. A method according to claim 4, wherein the electrodes are located in an axial or a radial direction relative to a support structure.

9. A method according to claim 2, wherein the catalytic converter stores an exhaust gas component selected from the group consisting of nitrogen oxides, carbon monoxide, hydrocarbons, and combinations thereof.

10. A method for determining a fullness or quality of a catalytic converter situated in an exhaust gas stream and having a storage medium for storing gases, said method comprising:

measuring a chance in at least one physical property of the storage medium that changes with an amount of gas stored therein; and determining a fullness or quality of the catalytic converter based on a result of said measurement;

wherein the at least one physical property is selected from the group consisting of the optical index of refraction, an optical absorption coefficient, and an optical reflection coefficient of the storage medium.

11. A method for determining a fullness or quality of a catalytic converter situated in an exhaust gas stream and having a storage medium for storing gases, said method comprising, measuring a change in at least one physical property of the storage medium that changes with an amount of gas stored therein, and, determining a fullness or quality of the catalytic converter based on a result of said measurement, wherein the at least one physical property is volume.

12. A method for determining a fullness or quality of a catalytic converter having a storage medium for storing gases flowing in an exhaust stream, comprising:

providing a measurement element in said exhaust stream, separate from said catalytic converter, and comprising a measurement medium similar to the storage medium;

measuring a change in at least one physical property of the measurement medium in the measurement element, that changes with an amount of gas stored therein; and determining a fullness or quality of the catalytic converter based on said measuring.

13. A method according to claim 12, wherein the at least one physical property is complex electrical impedance of the medium.

14. A method according to claim 13, wherein said measuring of the complex impedance is at one or more frequencies greater than 0 Hz.

15. A method according to claim 14, wherein an upper limiting frequency is a wavelength that is less than dimensions of a measuring arrangement.

16. A method according to claim 13, wherein said step of measuring of the complex electrical impedance comprises providing a substrate having an electrode structure applied to one flat side and an electrical heater applied to the other flat side, with the medium being applied to the flat side having the electrode structure.

17. A method according to claim 16, wherein the substrate comprises at least one material selected from the group consisting of silicon, quartz, and ceramic.

18. A method according to claim 16, wherein the electrical heater comprises metal strips 100 nm to 50 $\mu$m thick.

19. A method according to claim 16, wherein the electrode structure comprises a metal and has a layer thickness between 100 nm and 50 $\mu$m.

20. A method according to claim 16, wherein the medium has a layer thickness between 100 nm and 1000 Am.

21. A method according to claim 12, wherein the at least one physical property is thermo electromotive force, wherein said step of measuring of the thermo electromotive force comprises providing a substrate having an electrical heater mounted on one flat side and at least two thermocouple pairs mounted on the other flat side of the medium.

22. A method according to claim 21, wherein the substrate comprises a material selected from the group consisting of silicon, quartz, and ceramic.

23. A method according to claim 21, wherein the electrical heater comprises metal strips having a layer thickness of 100 nm to 50 $\mu$m.

24. A method according to claim 12, wherein the at least one physical property is selected from the group consisting of an optical index of refraction, an optical absorption coefficient, and an optical reflection coefficient of the medium.

25. A method according to claim 12, wherein the at least one physical property is volume.

* * * * *